United States Patent Office 3,453,048
Patented July 1, 1969

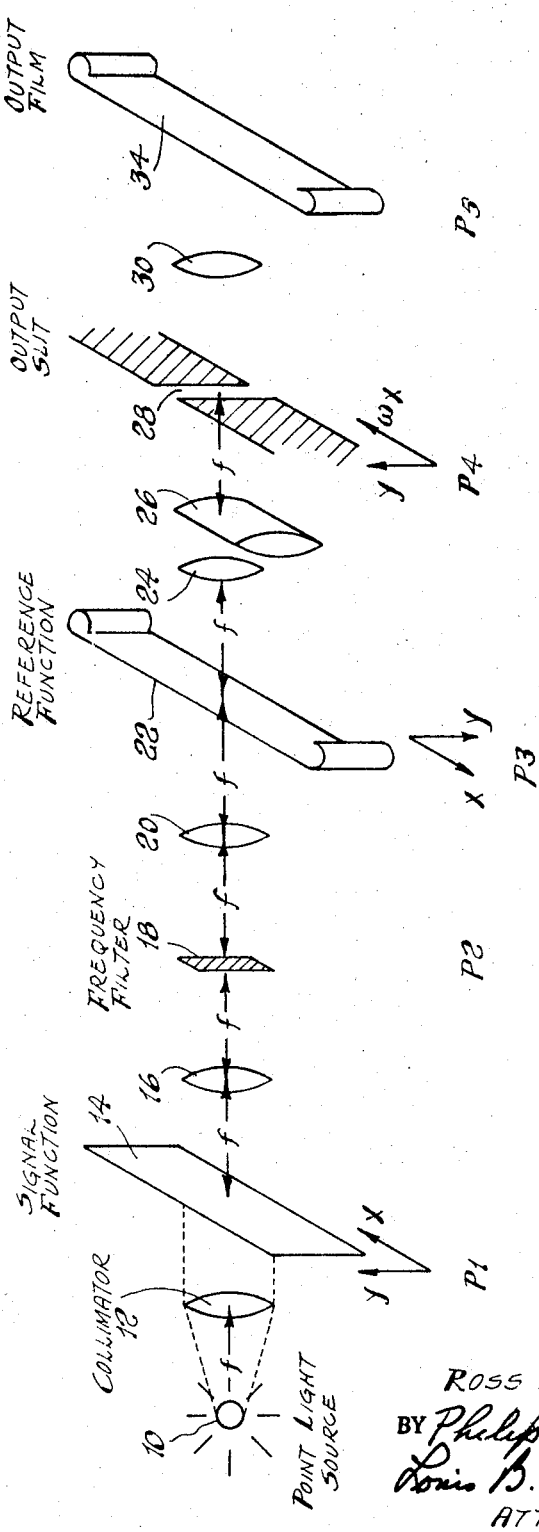

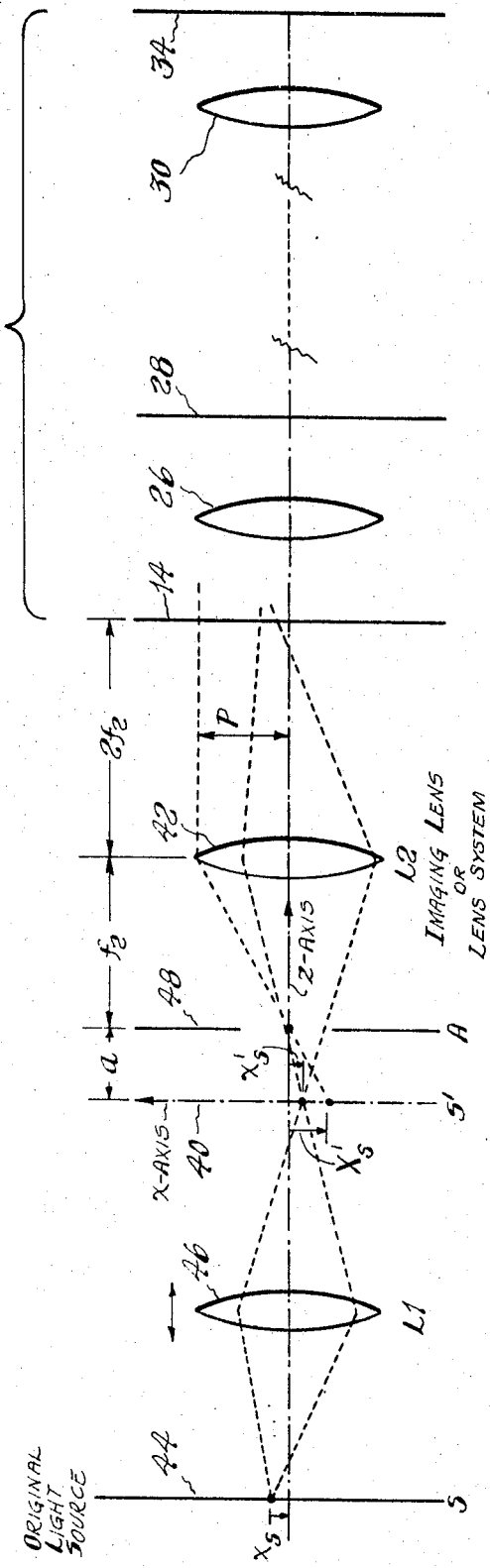

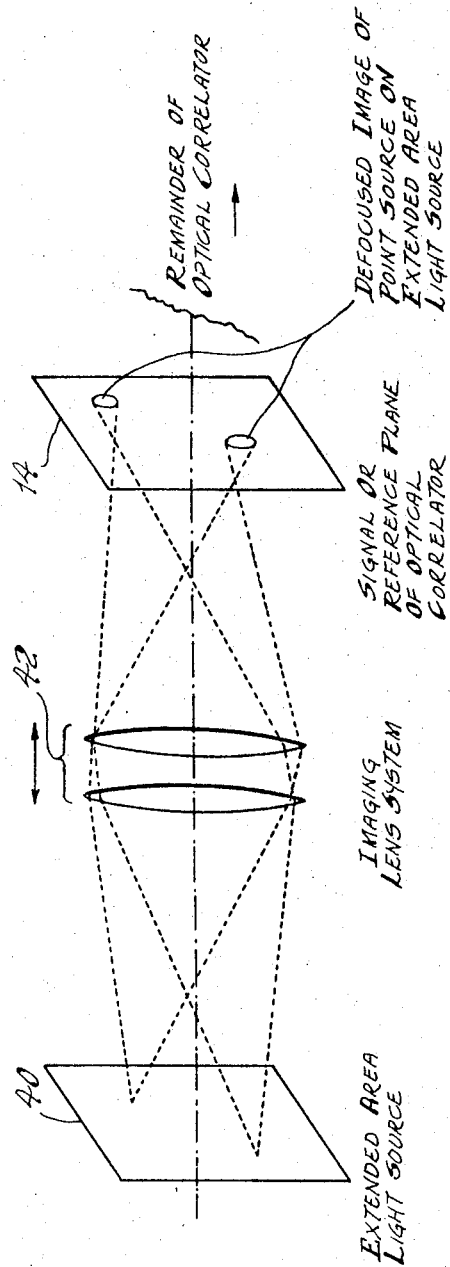

3,453,048
PARTIALLY COHERENT OPTICAL CORRELATOR
Ross E. Williams, Yonkers, N.Y., assignor to the
United States of America
Filed Dec. 28, 1964, Ser. No. 422,058
Int. Cl. G06k 9/08; G06g 7/19; G06f 15/34
U.S. Cl. 356—71  2 Claims

ABSTRACT OF THE DISCLOSURE

A partially coherent optical correlator which is formed by replacing with a non-coherent light source the point light source, condensing and collimating lenses and associated slits of a fully coherent optical correlator. An axially movable lens provides means for adjusting the coherence interval to optimize the correlator output in accordance with the amount of time-base distortion present in the received signal. This is accomplished practically by adjusting the position of a lens so that each point in the non-coherent source forms a circle of light of proper diameter on the signal plane, with adjacent circles overlapping each other. A total integration is performed by correlating over the diameter of each circle and summing all such correlations incoherently for all circles in the aperture.

---

This invention relates to optical correlators and especially to an optical correlator of the partially coherent type.

Designing practical versions of optimum receivers for waveforms which have been distorted by the medium through which they are propagated, or by reflection from moving objects, is not quite as straightforward as it might seem. It has been recognized for some time that a cross correlation performed between a reference, or transmitted, signal and a received signal having time base distortions degenerates rapidly as the integration time exceeds the coherence time of the received signal. Several types of mixed integrators have been proposed as optimum receivers for time-distorted waveforms. A mixed integrator correlates coherently over those time spans $T_i$ within the signal duration $T$ for which the signal can be expected to be coherent and then sums incoherently all the correlations so formed. Such a mixed integrator typically performs the following mathematical operations:

$$\phi\left(k_1 \ldots k_i \ldots k_n, = \sum_{i=1}^{n}[\phi_i(k_i, T_i)]^2 = \sum_{i=1}^{n}\left[\frac{1}{T_i}\int_{T_i} s(k_i t - T_i)r(k_i t)dt\right]^2 T_1 \ldots T_i \ldots T_n\right) \quad (1)$$

where it is assumed that the received signal is of the form $$s[k(t)t - \tau(t)]$$

and $$s(t) = n(t) + \alpha r(t)$$

$n(t)$ = additive noise
$r(t)$ = transmitted signal
$\alpha$ = attenuation factor imposed by the physical properties of the propagating medium and by the geometry of the transmitting and receiving locations.
$k(t)$ = Doppler, or time base, distortion factor which is a function of time within the signal duration $T \cdot k(t)$ is close to unity:

$$1 - \epsilon \leq k(t) \leq 1 + \epsilon$$

$\pm \epsilon$ = range of possible Doppler distortions.
$\tau(t)$ = range distortion factor which, with $k(t)$, represents a "rubberizing" of the original time base in $r(t)$ resulting from internal motion of the medium or its boundaries and reflection from accelerating targets.

$\phi_i(k_i, \tau_i)$ = coherent correlation over $T_i$, for Doppler distortion $k_i$ and delay $\tau_i$.
$T_i$ = that portion of the total signal duration $T$ over which the Doppler distortion factor $k(t)$ and range factor $\tau(t)$ are arbitrarily close to some constants $k_i$ and $\tau_i$.
$r$ = total number of $T_i$ intervals in $T$.

The sum $$\sum_{i=1}^{n}[\phi_i k_i, \tau_i]^2$$

includes only that $\phi_i$ in each interval $T_i$ for which the choices of $k_i$ and $\tau_i$ give maximum correlation, consistent with a requirement for continuity in the variation of $k_i$ and $\tau_i$ from interval to interval.

The actual operations performed by the mixed integration receiver would then consist of the following:

(1) Determining the length of the coherence interval $T_i$.
(2) Selecting appropriate $k_i$ and $\tau_i$ for each $T_i$.
(3) Coherently correlating the received signal $s(k_i t - \tau_i)$ against the reference $r(k_i t)$ over each time span $T_i$.
(4) Squaring and summing all such correlations for the various $T_i$ in $T$.

When many such received signals are present with distortions which are not necessarily common to all signal channels, the tasks (1) through (4) above become prohibitively difficult to carry out in real time by conventional electronic methods. The present invention is a partially coherent optical correlator designed to carry out an equivalent set of operations represented by Equation 3 on many parallel receiver channels simultaneously. Equation 3 also is a mixed integration in which the weighting function $\gamma(x-x')$ determines the extent of the coherence intervals. A correlation performed according to Equation 3, with $\gamma(x-x')$ matched to the coherence time of the distorted received signal, produces a larger correlation than could be obtained for the same signal with a strictly coherent correlation, albeit a smaller result than a strictly coherent correlation provides when operating on an undistorted signal. The processing gain is a function of the width of the coherence interval.

It should be noted here that the partially coherent correlations to be described are optimum when no attempt is made to remove predictable distortions before the received signals are processed. When the statistics of the distorting factors are separable from those of the signal and additive noise, either by filtering or otherwise, one form of an optimum receiver is an adaptive one which attempts to remove the temporal distortions on successive iterations of the correlation process. However, the present invention is concerned only with a nonadaptive correlator for processing temporarily distorted waveforms in real time, avoiding off-line iterations.

An object of this invention is to optimally process signals reflected from a moving target, and signals transmitted through a time-varying medium, in a sonar or radar system.

Other objects and many of the attendant advantages of this invention will be readily appreciated as the same becomes better understood by reference to the following detailed description when considered in connection with the accompanying drawings wherein:

FIG. 1 is a schematic illustration of a completely coherent optical correlator;

FIG. 2 is a schematic illustration of a partially coherent optical correlator, using a preferred type of light source; and FIG. 3 is a schematic illustration of a second type of light source for a partially coherent optical correlator.

From a physical point of view, the partially coherent optical correlator is a fairly simple extension of the conventional fully coherent correlator well described in the literature. Like the fully coherent correlator, it has a multichannel capacity which not only allows simultaneous correlations for many receiver channels, but also permits correlation against several reference functions which have been adjusted for a range of possible Doppler distortions. That is, instead of correlating received signals against a single reference $r(t)$, it is possible to correlate simultaneously against a set of functions $r(k_j t)$ with various Doppler distortion factors $k_j$ accommodated in the independent channels, $j$.

FIGURE 1 shows a schematic diagram of a fully coherent correlator whose complete description is given in "Optical Data Processing and Filtering," Cutrona, Leith, Palermo and Porcello, Trans. on Infor. Theory, IEEE, June 1960. For the present purpose, it is sufficient to say that the signal function is imaged upon the reference function and the Fourier transform of the product of the two appears in the output plane P5 by virtue of the integrating properties of a spherical and cylindrical lens combination just to the left of the output plane P5. (The letter P refers to a "plane.") This Fourier transform is converted to a correlation function by limiting the output to a vertical slit in P5 passing through the optic axis. This is provided by output slit 28. The integration is carried out only in the $x$ direction (with $x$ now replacing $t$ as the time dimension). Therefore the $y$ dimension is available for recording and correlating many receiver channels against the same reference $\tau(x)$, or a smaller number of receiver channels can be correlated against all members $r(k_j x)$ of a set of reference functions with the various $r(k_j x)$ recorded in independent ($j$) channels separated in the $y$ direction. The light intensity at the independent points of the slit in the $y$ dimension of P5 then represents the square of the correlation function for the various $s(k_1 x - \tau)$ and $r(k_j x)$ combinations:

$$I(k_1, k_j \tau_1) = |\int s(k_1 x - \tau_1) r(k_j x) dx|^2 \quad (2)$$

Thus, in some one of the $y$ channels for which $k_1 = k_j$, a proper correlation will be performed with the signal having a Doppler distortion $k_1 = k_j$ and range factor $\tau_1$ throughout the $x$ or time dimension. This is a fully coherent integration performed conventionally, making no use of mixed integration techniques. When significant time-base distortions are present within the signal duration, this type of correlation will be degraded considerably.

The partially coherent optical correlator, on the other hand, does not integrate coherently over the full aperture width in the $x$ dimension. Instead it uses a large number of overlapping coherent apertures of restricted extent to illuminate a distorted signal function $s[k(x)x - \tau(x)]$, where it is now assumed that $k$ and $\tau$ can be functions of $x$. It can be considered a superposition of many overlapping coherent correlators, each one with an aperture restricted by the light coherence interval projected upon the signal function. FIGURE 2 shows the manner in which a coherent wavefront of restricted extent is projected upon the signal function 14. Instead of Equation 1, the partially coherent optical correlator produces a mixed integration of the form $$I[k_1(x), k_j(x), \tau_1(x)] = \iint \gamma(x-x') s[k_1(x)x - \tau_1(x)] \\ r[k_j(x)x] s[k_1(x')x' - \tau_1(x')] r[k_j(x')x'] dx dx' \quad (3)$$

where $I$ = intensity
$k_1(x) = l^{th}$ received signal Doppler distortion factor as a function of $x$.
$k_j(x) = j^{th}$ reference function Doppler distortion factor as a function of $x$.
$\tau_1(x) = $ time varying delay of the $l^{th}$ received signal as a function of $x$.

The partially coherent optical correlator differs from the completely coherent correlator in the type of source illumination and the manner in which this illumination is focused upon the first aperture (signal or reference plane) of the correlator. An extended area light source with an appropriate imaging lens or imaging lens system 42 as shown in FIG. 2, replaces the point light source 10, condensing and collimating lenses 12 and any associated slits of the completely coherent correlator. The partially coherent correlator may be thought of as a superposition of many completely coherent correlators, each with a very restricted area of coherent illumination which does not fill the full optical aperture. The extended area light source 40, which in FIG. 2 is a secondary source, the original source being numbered 44, is merely any light source which is not a point light source. This may be an incandescent lamp or an arc lamp, for example.

A second species of light source for the partially coherent correlator is shown in FIG. 3. This comprises only a primary extended area light source 40 and an imaging lens 42. This differs from the light source of FIG. 2 in that in the former the imaging lens 42 can be moved along the optic axis while in the latter the imaging lens 42 is fixed in position and the lens 46 can be moved.

It should be stressed that for a partially coherent correlator the light source cannot be a single point source, but must be a source consisting of a large number of point sources between each of which there is phase independence. This type of source is what is meant by the term "extended area light source."

The focusing is then adjusted so that each point on the extended area source forms a circle on the signal plane 14, adjacent circles overlapping each other. Each circle results from a single wavefront from a single point on the extended area light source 40. The circles are incoherent with respect to the other circles but each circle is partially coherent across its own diameter, falling off in coherency as the perimeter is approached. Note that the term "focusing" is not used here to mean the achieving of the sharpest circles in the plane 14 but to indicate that a change in the diameter of the circles of light (and therefore a change in the coherence interval, the distance over which light amplitude coherence is maintained) is being effected.

The desired degree of partial coherence is set by the amount of time-base distortion present in the received signal. If no distortion were present, a completely coherent correlation would be optimum. When distorted signals are received, one practical method of determining the desired degree of coherence is to move lens 46 to alter the coherence interval on plane 14 until the correlator output is maximized. If the signal distortions can be predicted in advance, lens 46 can be preset in position to provide the coherence interval which will match the time over which the signal can be considered coherent.

The total integration is performed by correlating coherently over the diameter of each circle and summing all such correlations incoherently for all circles in the aperture.

In the limits, a fully coherent correlator can be made by using a single point source and collimating the light so that all desired points on the signal plane 14 are illuminated by a single wave front; or a fully incoherent correlator can be made by using an infinite number of point sources and imaging the points of light directly on the signal plane 14, so that the signal plane is illuminated by an infinite number of incoherent points of light.

The optical configuration of FIG. 2 produces a partially coherent optical correlation represented by Equation 3. When Equation 3 is considered in optical terms, it has the same general form as the expression for the total transmitted light intensity produced by partially coherent illumination of a transparency with transmissivity $[sk_1(x-\tau_1)r(k_j x)]$. Thus it suggests that partially coherent optics might be used in conjunction with an otherwise coherent optical correlator to achieve a mixed integration-type correlation. If the coherence aperture of the partially coherent illumination can be varied, it also suggests that the time constant, or coherence interval, of the mixed integration can be varied correspondingly. Partially coherent illumination can be produced in a number of ways, but the configuration of FIG. 2 is preferred for the following reasons:

(1) The coherence interval on the first or signal plane 14 of the optical correlator, can be varied easily by adjusting the axial position of a single lens 46 (L1).

(2) The normal to each small coherent wavefront at 14 is parallel to the optic axis.

(3) The sphericity of each small coherent wavefront is small enough within the coherent aperture to avoid appreciable degradation in the subsequent coherent correlation process.

The illumination on the signal plane 14, is produced by an infinite number of nearly plane wavefronts of limited and overlapping lateral extent, all propagating in the direction of the optic axis but with centers displaced laterally by infinitesimal amounts from one another. The coherent correlator to the right of the signal plane 14, being a linear device, merely superposes all of the short coherent correlations derived from the overlapping wavefronts of limited lateral extent to form a mixed integration, such that the light intensity varies as a function of $\overline{\tau_1(x)}$, the time coordinate in the correlator output plane, in direct analogy to Equation 3. This analogy will be demonstrated in the following paragraphs.

FIGURE 2 illustrates the geometry of the partially coherent light source in two dimensions, $x$ and $z$, only. The calculations below are also carried out for two dimensions but are readily extendible to the third, or $y$, dimension. The source plane S (44) consists of many independent light source points, each giving rise to a light amplitude (vector E or H) whose phase is random with respect to the phases associated with all other source points. Each source point in plane S (44), with coordinate $x_s$, is imaged by lens 46 into a corresponding source image point at $$x_s'$$

of plane S' (40). Lens 46 can be moved in the axial or $z$ direction to produce a corresponding displacement of the image plane S' (40) along the optic axis. Lens 46 can be moved only far enough to cause the image plane S' to lie somewhere between the aperture plane 48 (A) and a distance $f_2$ to the left of A, where $f_2$ is the focal length of lens 42 (L2). In terms of the nomenclature of FIG. 2, $0 \leq a \leq f_2$. When S' is coincident with the aperture plane A and the aperture is stopped down to a small orifice on the optic axis, the light rays passed by the orifice are collimated by L2 a focal length $f_2$ to the right so as to form a plane wavefront of constant phase across the aperture at 14. This configuration produces completely coherent illumination of plane 14. On the other hand, when L1 is moved to the left sufficiently to cause S' to be displaced an amount $f_2$ to the left of A, and the aperture in A is enlarged so as not to be a limiting aperture, each image point in S' is again imaged, this time by L2, upon a corresponding point of plane 14. Thus each point of plane 14 receives light only from a corresponding single point of S or S', and consequently the light amplitude at various points of plane 14 are independent and have random phases with respect to each other. This arrangement is said to produce completely incoherent illumination at plane 14. For intermediate positions of lenses L1 and image plane S', the illumination at plane 14 will be partially coherent, and the correlation of the phases of the light vectors at different points of plane 14 will be an inverse function of the distance between the points. The degree of coherence at plane 14 will depend upon the location of L1.

The proper extent of the coherence interval $(x-x')$, which in turn governs the desired shape of $\gamma(x-x')$, is set by the interval over which $k_1(x)$ can be made arbitrarily close to some $k_j(x)$ and $\tau_1(x)$ arbitrarily close to a constant so as not to degrade the coherent correlation. When stochastic delays $\tau_1(x)$ are present in the received signal, the expectation value of a coherent correlation is the correlation for an undistorted signal $$[k(x)=1, \tau_1(x)=\text{constant}=\overline{\tau_1(x)}]$$

convolved with the $\tau_1(x)$ probability density $\rho(\tau_1(x))$:

$$<\varphi(\overline{\tau_1(x)})> = \int \varphi_1(\overline{\tau_1(x)} - \tau_1(x)) \rho(\tau_1(x)) d\tau_1(x) \quad (4)$$

where $<\phi_1[\tau(x)]>$ = expectation value of the coherent correlation function in the presence of a time varying delay $\tau_1(x)$, $\varphi_1(\overline{\tau_1(x)})$ = the same correlation function in the absence of a time varying delay.

Thus $\rho(\tau_1(x))$ is a smearing function which acts to degrade the coherent correlation function $\phi_1(\overline{\tau_1(x)})$. If the coherent correlation is performed by integrating over short intervals of the signal time base, the range of possible $\tau_1(x)$ values within each interval $i$ departs from the mean value for the interval, $\overline{\tau_1(x)}^i$, by a very small amount and $\rho_j(\tau_1(x))$ is extremely peaked at $\tau_1(x) = \overline{\tau_1(x)}^i$. Thus, a short coherence interval $(x-x')$, or a narrow and peaked $\gamma(x-x')$, guarantees minimum degradation of the coherent correlation function appearing as a part of Equation 2:

$$\int \gamma(x-x') s[k_1(x)x - \tau_1(x)] r[k_j(x)x] dx \quad (5)$$

where $\gamma(x-x')$ is a weighting function centered about $x-x'$. The partially coherent correlation $$I[k_1(x), k_j(x), \tau_1(x)]$$

in Equation 2 is a second order incoherent sum of several coherent correlations of the type in Equation 5. Therefore maximizing the individual coherent correlations represented by Equation 5 will help to maximize I in Equation 3.

However, that the peak amplitude of the partially coherent correlation I, even for an undistorted signal, varies monotonically with the width of the coherence interval $(x-x')$ in the partially coherent or mixed integration. In other words, the wider the $(x-x')$ coherence interval, or the closer the mixed integration is to a purely coherent correlation, the larger will be the peak amplitude in the correlation provided the signal does not decorrelate in this interval. Therefore, to maximize Equation 3, an optimum compromise on the shape of $\gamma(x-x')$ must be sought for which the coherence interval is sufficiently short to narrow the width of the smearing function $\rho_1(\tau_1(x))$ and enhance Equations 4 and 5, but wide enough to avoid undue reduction of the peak amplitude in the mixed integration correlation. The proper choice of $\gamma(x-x')$ will depend upon the exact nature of $\rho(\tau_1(x))$, which is determined by conditions in the propagating medium and the parameters of target motion. In general terms, $\gamma$ should be large for small values of its argument, corresponding to short time intervals over which the received signal is coherent, and small for large values of the argument. A Gaussian or $$\frac{\sin (x-x')}{(x-x')}$$

choice is quite representative of the desired shape in the sense that it weights the correlation interval most heavily when $x$ is close to $x'$ in (5) and $k_1(x)$ and $\tau_1(x)$ are therefore close to their values of $x'$, the center of the coherence interval where a match is sought with $r(k_jx)$. Furthermore, the Gaussian and $$\frac{\sin (x-x')}{(x-x')}$$

shapes, and particularly the latter, can be simulated in the partially coherent optical correlator.

By recording the various $r(k_jx)$ for different $k_j$ in channels spaced in the $y$ direction of the correlator reference plane, it is possible to correlate against the full set of possible constant velocity Doppler distortions of the transmitted signal. Therefore, when distortions are imposed by a target moving with constant radial velocity, one of the $r(k_j x)$ will correlate against the received signal in a fully coherent manner. Hence, in an optical correlator, it is not necessary to turn to mixed integration to accommodate constant velocity distortions. However, in the presence of accelerated motion, either of the target or of the reflecting interfaces in the medium, it may not be possible to perform a coherent correlation over the full aperture width of a single $k_j$ channel. A partially coherent correlation, or mixed integration, must be effected in which the shorter coherent correlations in the appropriate $k_j$ channels are summed incoherently over the full aperture width. This incoherent summation is carried out along directions which are parallel with the axis of the cylindrical lens in FIG. 1, and these directions establish the $x$ and $x'$ axes which are no longer necessarily perpendicular to the $y$ dimension. With the lens oriented as shown in FIG. 1, the incoherent summing occurs along each the $k_j$ channels without mixing them. Rotating the cylindrical lens about the optic axis of the correlator puts the cylindrical lens axis in a position to perform the incoherent summation across any given number of $k_j$ channels, and in a time sequence dictated by the arrangement of the $r(k_j x)$ in the $j$ channels of the reference plane. Then $k_j$ becomes a function of $x$, as in Equation 1, since the $x$ axis, or direction of in coherent summation, is no longer parallel to the channels. Of course, the way in which $k_i(x)$ in the signal $$s[k_1 x(x) - \tau_1(x)]$$

varies with $x$ depends upon the nature of the target or medium boundary accelerations; and it is not usually possible to predict the functional form of $k_1(x)$ and, therefore, the desired inclination of the cylindrical lens axis. Moreover, even if $k_1(x)$ could be properly compensated, the fact that $k_1(x)$ varies within the optical aperture implies that the time delays $\tau_1(x)$ also vary. Therefore, the peak of the correlation function in each coherent interval $i$, as limited by $\gamma(x-x')$ will occur at slightly different times $\overline{\tau_1(x)}^i$ for the different $i$ intervals, and the incoherent summation, which is formed instantaneously by the cylindrical lens for a constant delay $\tau$ throughout the aperture, will not sum the coherent correlations so that their peak amplitudes are superimposed. This is readily visualized by regarding the signal distortions again as a "rubberizing" of the signal time base. Then the $\tau_1(x)^i$ corresponding to a correlation peak in each $\gamma(x-x')$ interval (each value of $x'$ in Equation 5 must vary in a continuous fashion from one interval to the next. Any continuous variation of $\tau_1(x)$ with $x$ is allowed in the partially coherent correlation represented by Equation 3, but the type of integration performed by the cylindrical lens of FIG. 1 is restricted to a particular choice, $\tau_1(x)$, across the entire aperture. Thus, the partially coherent optical correlator does not exploit the full potential of Equation 3 in the sense that it does not correct for time-base distortions so as to align all the correlation peaks; but it does reduce the coherence interval to one characteristic of the propagating medium so that a coherent correlation peak achieved in a particular time interval is not completely destroyed by the coherent addition of out-of-phase correlations in the other intervals. Instead, these other correlations are added incoherently, or energy-wise, so that they merely add incoherent noise to the valid correlation formed in one interval. At slightly earlier or later delay times $\tau_1(x)$ other intervals of the signal time base will correlate with other corresponding portions of the reference functions $r[k_j(x)x]$. Thus, the net effect is to broaden the ambiguity function in both Doppler $k_j(x)$ and range, $\tau_1(x)$, as well as to lower the peak correlation amplitude. A second benefit accrues from reducing the coherence interval in the partially coherent optical correlator in that the frequency or Doppler resolution of the correlation process is reduced correspondingly thereby lessening the chance for decorrelation due to a changing $k_1(x)$ within the coherence interval.

Obviously many modifications and variations of the present invention are possible in the light of the above teachings. It is therefore to be understood that within the scope of the appended claims the invention may be practiced otherwise than as specifically described.

I claim:

1. In an optical correlator which produces a function of a true correlation of the type $\phi(\tau) = \int r(x)s(x+\tau)dx$, said optical correlator having a plane in which a signal or reference function is positionable,
    a non-coherent light source, and
    means for selectively controlling the coherence interval on said plane of light projected thereon by said source.

2. The combination set forth in claim 1, wherein said means for controlling the coherence interval comprises:
    light-imaging means having at least one component lens which has an optical axis passing therethrough; and
    variable-aperture diaphragm means,
        said component lens and said light source being movable relative to each other along said optical axis passing through said lens component,
        the size of the aperture in said diaphragm being variable in conjunction with the relative movement between said lens and light source, the aperture size being decreased as the relative movement causes neighboring circles of light projected upon said plane to more completely overlap each other.

References Cited

UNITED STATES PATENTS 3,030,021   4/1962   Ferre _____ 235—181

DAVID SCHONBERG, *Primary Examiner.*

RONALD J. STERN, *Assistant Examiner.*

U.S. Cl. X.R.

235—181; 350—162